United States Patent
DeForest et al.

(10) Patent No.: US 10,671,093 B2
(45) Date of Patent: Jun. 2, 2020

(54) AZIMUTHAL POINTING SYSTEM FOR SCIENTIFIC BALLOONING

(71) Applicant: Southwest Research Institute, San Antonio, TX (US)

(72) Inventors: Craig E. DeForest, Nederland, CO (US); Glenn T. Laurent, Lakewood, CO (US); Jedediah H. Diller, Boulder, CO (US)

(73) Assignee: Southwest Research Institute, San Antonio, TX (US)

( * ) Notice: Subject to any disclaimer, the term of this patent is extended or adjusted under 35 U.S.C. 154(b) by 327 days.

(21) Appl. No.: 15/609,676

(22) Filed: May 31, 2017

(65) Prior Publication Data

US 2018/0348795 A1 Dec. 6, 2018

(51) Int. Cl.
G05D 1/08 (2006.01)
B64B 1/42 (2006.01)

(52) U.S. Cl.
CPC ............ *G05D 1/0808* (2013.01); *B64B 1/42* (2013.01)

(58) Field of Classification Search
CPC .. G05D 1/0094; G05D 1/0808; G05D 1/0858; B64C 17/04; B64B 1/42; B64B 1/40; B64D 17/34

See application file for complete search history.

(56) References Cited

U.S. PATENT DOCUMENTS

| | | | | |
|---|---|---|---|---|
| 3,069,114 A | * | 12/1962 | Maas | B64B 1/58 244/31 |
| 3,698,667 A | * | 10/1972 | Studenick | B64B 1/40 244/32 |
| 5,396,815 A | | 3/1995 | Polites | |
| 5,884,867 A | * | 3/1999 | Gordon | B64D 1/02 244/1 R |
| 9,266,598 B1 | * | 2/2016 | DeVaul | B64B 1/56 |
| 2014/0191893 A1 | * | 7/2014 | Fox | G01S 13/0218 342/27 |
| 2016/0202704 A1 | * | 7/2016 | Hoheisel | B64B 1/40 701/4 |

OTHER PUBLICATIONS

Romualdez et al., Jan. 23, 2015, JAE, https://arxiv.org/pdf/1603.01161.pdf, pp. 5-6 (Year: 2015).*

Aubin, F., et.al., "Torsional Balloon Flight Line Oscillations: Comparison of Modelling to Flight Data, Advances in Space Research," submitted, Feb. 8, 2017 ( arXiv:1702.01817v1 [astro-ph.IM] , https://arxiv.org/abs/1702.01817), to be published in Advances in Space Research, Aug. 1, 2017, pp. 702-708, vol. 60, Issue 3, ScienceDirect, Elsevier, Inc, Cambridge, MA, USA.

(Continued)

Primary Examiner — Christopher D Hutchens
(74) Attorney, Agent, or Firm — Grossman, Tucker, Perreault & Pfleger, PLLC

(57) ABSTRACT

One embodiment provides an azimuthal pointing system for scientific ballooning. An apparatus, method and/or system are configured to drive a motor to twist a torsion member of a torsion pendulum and to utilize a restoring force of the torsion member to adjust a pointing direction (i.e., pointing angle) of a payload. The torsion pendulum includes the torsion member, the payload and the motor. The payload is coupled to the torsion member by the motor.

14 Claims, 4 Drawing Sheets

(56) References Cited

OTHER PUBLICATIONS

Chingcuanco, A.O., et.al., "Modeling and Control of a Balloon Borne Stabilized Platform, Journal of Dynamic Systems, Measurement, and Control," Dec. 1990, pp. 703-710, vol. 112, American Society of Mechanical Engineers, New York, NY, USA.
Chingcuanco, A.O., et.al., "Model Reference Adaptive Control for the Azimuth-Pointing System of a Balloon Borne Stabilized Platform," International Journal of Adaptive Control and Signal Processing, 1991, pp. 107-120, vol. 5, Wiley, Hoboken, NJ, USA.
Connnor, M., "Balloon Flight Opens Door to Lowering Cost for Solar Research," (https://www.nasa.gov/centers/armstrong/features/lower_cost_solar_research.html), NASA Armstrong Flight Research Center feature story, 2016, last updated 2018.
Laurent, G., et.al., "B-SSIPP: The Balloon SwRI Solar Instrument Pointing Platform, Next-Generation Suborbital Researchers Conference," Jun. 2-4, 2016, Broomfield, CO, USA.
Quine, B., et.al., "Scanning the Earth's Limb from a High-Altitude Balloon: The Development and Flight of a New Balloon-Based Pointing System," Journal of Atmospheric and Oceanic Technology, May 1, 2002, pp. 618-632, vol. 19, American Meteorological Society, Boston, MA USA.
Schmid, D., "SwRI to demonstrate low-cost miniature solar observatory," (https://www.swri.org/press-release/swri-demonstrate-low-cost-minature-solar-observatory.html), Southwest Research Institute Press Release, 2016, San Antonio, Texas, USA.
Shariff, J.A., et.al., "Pointing control for the SPIDER balloon-borne telescope, Ground-Based and Airborne Telescopes," submitted, Jul. 7, 2014 ( arXiv:1407.1880v1 [astro-ph.IM], arXiv.org), pp. 1-20, published Jul. 22, 2014, in vol. 9145, Proceedings of Society of Photo-Optical Instrumentation Engineers, Bellingham, Washington, USA.

* cited by examiner

US 10,671,093 B2

AZIMUTHAL POINTING SYSTEM FOR SCIENTIFIC BALLOONING

GOVERNMENT SUPPORT CLAUSE

This invention was made with United States Government support under Contract No. NND12AE39C funded by NASA. The Government has certain rights in this invention.

FIELD

The present disclosure relates to an azimuthal pointing system, in particular to, an azimuthal pointing system for scientific ballooning.

BACKGROUND

Scientific balloons may be used to elevate scientific payloads. Generally, a scientific payload may be suspended from a scientific balloon via a suspension train. Scientific instruments configured to capture data may be contained in the scientific payload. Data capture is facilitated by aiming, i.e., pointing, the scientific payload in a target direction. The target direction may include an angle in azimuth related to a defined reference direction. During suspension, the balloon may rotate. For example, the balloon may acquire angular momentum during ascent through layers of atmosphere and/or due to torque from surrounding winds at float altitude. A mechanism, e.g., a motor, may be included in and/or coupled to the scientific payload and coupled to the suspension train. The motor may then be configured to rotate the scientific payload relative to the balloon to adjust a pointing direction (i.e., pointing angle) of the scientific payload.

The suspension train is typically relatively light compared to the payload and may generally have a relatively weak effective torsional spring constant. Thus, applying a torque, e.g., by the motor, to a suspension point of the scientific payload may at least initially twist the suspension train rather than steering the payload itself. The scientific payload and suspension train typically form a torsional pendulum with a period between 20 seconds and 200 seconds and decay times of hundreds of periods. Thus, the payload pointing direction may recover relatively slowly following a disturbing torque.

The suspension train may be "stiffened" by a reaction wheel configured to serve as a source or a sink for angular momentum. Torque to rotate the payload may be supplied by a torque motor. The reaction wheel is relatively heavy and is configured to resist rotation. The motor torque configured to steer the payload may then be applied to the reaction wheel rather than the relatively light suspension train. In other words, the motor can "push against" the reaction wheel. A secondary system may be included configured to gradually "dump" angular momentum into the balloon.

SUMMARY

In one example, there is provided an apparatus. The apparatus includes calibration circuitry and steering circuitry. The calibration circuitry is configured to determine a pendulation rate ($\omega_P$) of a torsion pendulum suspended from a balloon. The torsion pendulum includes a torsion member, a payload and a motor. The payload is coupled to the torsion member by the motor. The steering circuitry is configured to drive the motor to adjust a twist angle ($\phi_L$) of the torsion member. The adjusting the twist angle is configured to adjust a payload pointing angle ($\theta_S$) to a new target pointing angle or maintain the payload pointing angle to within a predetermined tolerance of a current target payload pointing angle.

In another example, there is provided a method. The method includes determining, by calibration circuitry, a pendulation rate ($\omega_P$) of a torsion pendulum suspended from a balloon. The torsion pendulum includes a torsion member, a payload and a motor. The payload is coupled to the torsion member by the motor. The method further includes driving, by steering circuitry, the motor to adjust a twist angle ($\phi_L$) of the torsion member. The adjusting the twist angle is configured to adjust a payload pointing angle ($\theta_S$) to a new target pointing angle or maintain the payload pointing angle to within a predetermined tolerance of a current target payload pointing angle.

In another example, there is provided a system. The system includes a torsion pendulum suspended from a balloon. The torsion pendulum includes a torsion member; a payload; a motor and a controller circuitry. The motor includes a motor shaft and a motor housing. The motor shaft is torsionally rigidly coupled to the torsion member. The motor housing is torsionally rigidly coupled to the payload.

The controller circuitry includes a calibration circuitry and a steering circuitry. The calibration circuitry is configured to determine a pendulation rate ($\omega_P$) of the torsion pendulum. The steering circuitry is configured to drive the motor to adjust a twist angle ($\phi_L$) of the torsion member. The adjusting the twist angle is configured to adjust a payload pointing angle ($\theta_S$) to a new target pointing angle or maintain the payload pointing angle to within a predetermined tolerance of a current target payload pointing angle.

FIGURES

Features and advantages of the claimed subject matter will be apparent from the following detailed description of embodiments consistent therewith, which description should be considered with reference to the accompanying drawings, wherein:

Figure 1:
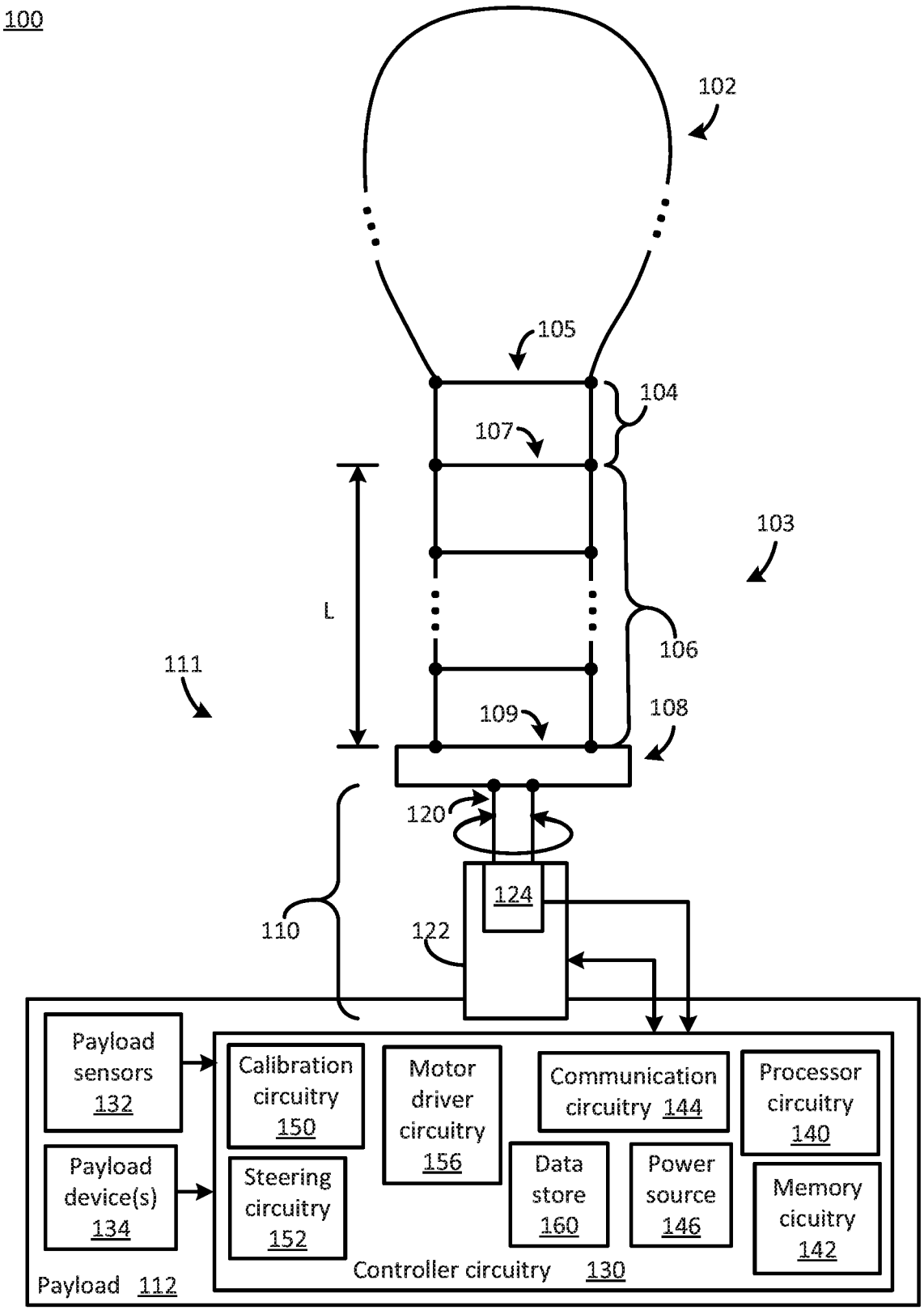
FIG. 1 is a sketch of a scientific balloon system that includes an azimuthal pointing system, consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

The reaction wheel may contribute additional weight to the scientific balloon system. While rotating, the reaction wheel and associated wheel bearing may introduce vibration into the suspension train. A torque motor may consume relatively more energy, may have relatively more mass and may be relatively more expensive compared to, for example, a brushless direct current (DC) motor. Increased energy consumption corresponds to a relatively higher capacity battery and thus, generally, even more mass.

Generally, this disclosure relates to an azimuthal pointing system for scientific ballooning. An apparatus, method and/or system are configured to drive a motor to twist a torsion member of a torsion pendulum and to utilize a restoring force of the torsion member to adjust a pointing direction (i.e., pointing angle) of a payload. The torsion member is included in a suspension train of a scientific balloon system. The payload is coupled to the suspension train and thus, the torsion member, by the motor. The torsion member, motor and payload correspond to the torsion pendulum. The apparatus, method and/or system are configured to further control the motor to minimize and/or eliminate oscillation (i.e., pendulation) of the torsion pendulum as the payload orientation (i.e., payload pointing angle) converges on a target payload pointing angle.

The apparatus, method and/or system are configured to determine a pendulation rate and pendulation period of the torsion pendulum on float. The apparatus, method and/or system are further configured to determine a balloon angle relative to a reference direction and a balloon rotation rate on float. A motor angle relative to the payload ("null motor angle") may then be determined that corresponds to an equilibrium twist angle (e.g., twist angle equal to zero) of the torsion member. The balloon angle, balloon rotation rate and null motor angle may be initially determined during calibration operations on float and may then be updated (e.g., corrected) during steering operations. The determined balloon angle, determined balloon rotation rate and determined null motor angle may then correspond to a modeled balloon angle, a modeled balloon rotation rate and a modeled null motor angle, respectively. The modeled balloon angle, modeled balloon rotation rate and modeled null angle may be determined based, at least in part, on a relationship between the pendulation rate and the payload pointing angle. Motor control during steering operations may be based, at least in part, on a relationship between pendulation rate and payload pointing angle, as described herein.

A motor, e.g., a brushless DC motor, controlled (i.e., driven) to a target motor angle and/or target motor rotation rate, may be utilized to twist the torsion member and/or accommodate the balloon rotation. A change in payload pointing angle may be initiated by a change in motor angle configured to twist the torsion member. The twist of the torsion member, the corresponding restoring torque and pendulation may then implement changing (i.e., adjusting) the payload pointing angle. The motor may be further driven to manage the pendulation. The motor may be controlled based, at least in part, on torsion pendulum parameters, based, at least in part, on measured, i.e., sensed, payload pointing angle and payload rotation rate and based, at least in part, on the determined model parameters (i.e., balloon angle, balloon rotation rate and null motor angle).

Thus, the restoring force of the torsion member and torsion pendulum may be utilized to steer the payload. The additional mass associated with a reaction wheel and associated mass and cost of a torque motor may then be avoided.

FIG. 1 is a sketch of a scientific balloon system 100 that includes an azimuthal pointing system, consistent with several embodiments of the present disclosure. As used herein, azimuth is a horizontal angle measured from a reference direction, e.g., true North. Unless otherwise specified, angles and/or orientations described herein are azimuthal angles. Scientific balloon system 100 includes a balloon 102, a suspension train 103, a motor 110 and a payload 112. The balloon 102 may also be termed an "envelope". The suspension train 103 includes other suspension train elements 104, a torsion member 106 and a truck plate 108. The motor 110 includes a motor shaft 120, a motor housing 122 and motor sensors 124. Other suspension train elements 104 may include, but are not limited to, a parachute, a packed balloon case and a separation mechanism for separating the parachute from the balloon 102.

The torsion member 106 may include, but is not limited to, a torsion rod, a torsion bar, a torsion ladder, a torsion spring, etc. For example, torsion member 106 is illustrated as a torsion ladder that includes two parallel columns of compliant vertical members separated by one or more generally horizontal rigid elements. The torsion ladder 106 may form a helix when twisted as described herein. Torsion ladder 106 is one nonlimiting example of a torsion member. The torsion member 106 is configured to store energy when twisted and to provide the energy as a restoring torque when released.

The motor 110 may contain other elements, e.g., a stator, a rotor, internal wiring, etc., that are not shown for ease of illustration and description. The motor 110 may include, but is not limited to, a brushless direct current (DC) motor, a stepper motor, a servo motor, etc. The motor 110 may receive inputs configured to drive the motor shaft 120 to rotate to a target angle with respect to the motor housing 122, control a rotation rate of the motor shaft 120 and/or control an angular acceleration of the motor shaft 120. As used herein, "motor angle" corresponds to an angle of the motor shaft relative to the motor housing, "motor rotation rate" corresponds to an angular velocity of the motor shaft relative to the housing and "motor angular acceleration" corresponds to the angular acceleration of the motor shaft relative to the housing.

The truck plate 108 is a rigid structure and may include, but is not limited to, channel iron, steel channel, rectangular tubular steel, square tubular steel, etc. The truck plate 108 is configured to rigidly couple to the motor shaft 122 and to the torsion member 106, thus, rigidly coupling the motor shaft 110 to the torsion member 106.

Motor sensors 124 include a motor shaft position sensor and a motor speed sensor. The motor sensors 124 may include, but are not limited to, optical encoders, magnetic encoders, etc. The motor shaft position sensor is configured to measure an angle, $\phi_M$ ("motor angle"), of the motor shaft 120 relative to the motor housing 122. The motor speed sensor is configured to measure a motor angular velocity, $\omega_M$ ("motor speed", "motor rotation rate"), i.e., a rotation rate, of the motor shaft 120. As used herein, "rotation rate" and/or "angular velocity" correspond to a change in angle with respect to time. Thus, the rotation rate of the motor shaft, $\omega_M$, corresponds to $d\phi_M/dt$, where d/dt is a first order derivative with respect to time.

As used herein, time is measured in seconds. As used herein, rotation rate and/or angular velocity have units of radians per second. As used herein, change in rotation rate, i.e., change in angular acceleration, has units of radians per second per second. As used herein, pointing angles (i.e., pointing directions) have units of radians or degrees. As used herein, a controlled angle may be controlled to within a predetermined tolerance of a target angle. The predetermined tolerance of the target angle corresponds to the target angle plus or minus the predetermined tolerance. As used herein, a measured angle may be considered to be at a target angle when the measured angle is within the predetermined tolerance of the target angle. In one nonlimiting example, the predetermined tolerance may be 0.01 radian. In another example, the predetermined tolerance may be greater than or less than 0.01 radian. The predetermined tolerance may be determined and/or selected based, at least in part, on a particular application. Accordingly, the predetermined tolerance herein can vary within the range of 0.001 radian to 0.05 radian.

The payload 112 includes a controller circuitry 130 and payload sensors 132. The payload 112 may further include one or more payload devices 134. For example, the payload devices 134 may be configured to capture scientific data when the scientific balloon system 100 is "on float". Payload sensors 132 include a payload angle sensor, a payload rotation rate sensor and a payload angular acceleration sensor. The payload sensors 132 may include, but are not limited to, a magnetic compass, an inertial gyro-compass, a photometer, a magnetometer, a star tracker, an other direction finding device, a gyroscope, etc.

Payload sensors 132 are configured to detect, capture and/or determine a payload angle $\theta_S$, a payload angular velocity $\omega_S$ and/or a payload angular acceleration $\alpha_S$. The payload angle sensor is configured to measure the angle of the payload, $\theta_S$, relative to a reference direction, e.g., true North. The payload rotation rate sensor is configured to measure the payload rotation rate, $\omega_S$. The payload angular acceleration sensor is configured to measure the payload angular acceleration, $\alpha_S$. As used herein, "angular acceleration" corresponds to a change in angular velocity with time. Thus, the angular acceleration of the payload, $\alpha_S$, corresponds to $d\omega_S/dt$ and $d^2\theta_S/dt^2$, where the exponent 2 corresponds to second derivative. The payload rotation rate may also be determined as a change in payload angle over a time interval. Similarly, the payload angular acceleration may be determined as a change in payload angular velocity over a time interval.

The suspension train 103 is torsionally rigidly mounted to the balloon 102 at a first end 105 of the suspension train 103. The first end 105 of the suspension train 103 corresponds to a first end of the other suspension train elements 104. A second end of the other suspension train elements 104, opposite the first end, is coupled to a first end 107 of the torsion member 106. A second end 109 of the torsion member 106, opposite the first end 107, is coupled to the truck plate 108. The second end 109 of the torsion member 106 may be torsionally rigidly mounted to the truck plate 108. The payload 112 is coupled to the balloon 102 via the motor 110 and the suspension train 103. The motor shaft 120 is torsionally rigidly coupled to the truck plate 108 and the motor housing 122 is torsionally rigidly coupled to the payload 112. Thus, rotation of the motor shaft 120 with respect to the motor housing 122 corresponds to rotation of the motor shaft 120 with respect to the payload 112. $\phi_M$ corresponds to angle of the motor shaft 120 relative to the housing 122. In other words, $\phi_M$ is angle of the motor shaft 120 relative to the payload 112. Thus, $\phi_M$, corresponds to an angle of the payload 112 relative to the truck plate 108 and the second end 109 of the torsion member 106.

The torsion member 106, truck plate 108, motor 110 and payload 112 correspond to a torsion pendulum 111. The torsion member 106 may be twisted by rotation of the truck plate 108 (e.g., by rotation of motor shaft 120) and/or the balloon 102. Twist of the torsion member 106 is represented by twist angle, $\phi_L$. The twist angle may be understood as a rotation of the second end 109 relative to the first end 107 of the torsion member 106. In other words, the twist angle may correspond to a rotation of the truck plate 108 (from an equilibrium position) relative to the first end 107 of the torsion member 106. In its neutral, i.e., un-twisted, state, the torsion member 106 may have length, L, and the twist angle may be equal to zero. When twisted, the length of the torsion member 106 may shorten. The change in length, $\Delta L$, is proportional to the square of the twist angle as $-\Delta L = \beta \phi_L^2$, where $\beta$ is a constant of proportionality. In the twisted state, the torsion pendulum 111 has stored energy related to characteristics of the torsion member 106 and the mass of at least the payload 112. The stored energy may then be utilized to, e.g., rotate the payload 112. The torsion member 106 may exert a torque that is related to the torsion coefficient of the torsion member 106 and the twist angle, e.g., angle from equilibrium position. For example, if the first end 107 is fixed and the second end 109 is rotated an initial nonzero angle from the equilibrium position and then released, the torsion member 106 and torsion pendulum 111 will "pendulate". In other words, the twist angle, as a function of time, as the torsion member 106 pendulates corresponds to a damped oscillation. Characteristics of the pendulation are related to physical parameters of the balloon system 100, e.g., the torsion coefficient of the torsion member 106 and a moment of inertia of the payload 112.

In operation, the balloon 102 is configured to elevate the suspension train 103, motor 110 and payload 112. Payload devices 134 may be configured to capture scientific data, e.g., when the balloon system 100 is "on float" (in a neutral buoyancy condition in the atmosphere). Controller circuitry 130 may be configured to aim, i.e., point, the payload 112 in a specified direction, i.e., at a target angle relative to a reference direction. For example, the target angle may be provided by payload devices 134. When the scientific balloon system 100 is on float, the balloon 102 may rotate at a balloon rotation rate, $\omega_B$, as described herein, and may have a balloon phase angle, $\theta_B$, relative to a reference direction. The controller circuitry 130 may be configured to drive the motor 110 to rotate the payload 112 to accommodate the rotation of the balloon. The controller circuitry 130 may be further configured to drive the motor 110 to twist the torsion member 106 to adjust the pointing angle of the payload 112 and/or to manage the pendulation of the torsion member 106. A natural pendulation period of the system 100 is long compared to a target time constant associated with control of the pointing angle of the payload. As used herein, "azimuthal pointing system" corresponds to the torsion member 106, the motor 110, the controller circuitry 130 and the sensors 124, 132.

The balloon 102 has a balloon moment of inertia, $I_B$, and the payload 112 has a payload moment of inertia, $I_S$. The balloon moment of inertia, $I_B$, may be on the order of 10 to 100 times the payload moment of inertia, $I_S$. Thus, the balloon rotation rate, $\omega_B$, may be generally unaffected by rotation of the payload 112 and the balloon 102 may be considered rigid relative to the motor 110. In other words, $\omega_B$ may generally be unaffected during operation of the motor 110 configured to change the pointing angle of the payload 112, as described herein. On float, $\omega_B$ may be slowly varying and thus may be considered constant for relatively short time intervals. As used herein, a "relatively short time interval" corresponds to on the order of tenths of a pendulation period and/or, at most, on the order of ones of a pendulation period, $T_P$, of the torsion pendulum 111. Generally, $T_P$ may be in the range of 10 seconds to 100 seconds. The balloon pointing angle, i.e., phase angle, $\theta_B$, of the balloon, may then be estimated as:

$$\theta_B = \omega_B t + \theta_{B,0} \tag{1}$$

where t is time, $\theta_{B,0}$ is an initial angle of the balloon (at t=0) and $$\frac{d\omega_B}{dt}$$

is relatively small. The pointing angle of the payload, $\theta_S$, may then correspond to:

$$\theta_S = \theta_B + \phi_L + \phi_M \quad (2)$$

In other words, the pointing angle of the payload corresponds to a sum of the pointing angle of the balloon 102, the twist angle of the torsion member 106 and the angle of the motor 110. $\theta_S$ and $\theta_B$ are both relative to a reference direction (e.g., true North). $\phi_L$ is relative to $\theta_B$. $\phi_M$ is relative to the payload, i.e., $\phi_M$ is relative to $\theta_S$.

The torsion member 106 has a relatively weak spring constant. Thus, driving the motor 110 to initiate rotation and/or to change a rotation rate of the motor shaft 120 may result, initially, in twisting the torsion member 106 rather than rotating and/or changing a rotation rate of the payload 112. In response to the twist, the torsion pendulum 111 may then pendulate. The pendulation of the torsion pendulum 111 may result in a corresponding oscillation of the payload 112 pointing angle, $\theta_S$. The equation of motion for $\theta_S$ as a function of twist angle, $\phi_L$, may be written as:

$$\frac{d^2\theta_s}{dt^2} = -\frac{k_L}{I_s}\phi_L - m_L\frac{d\phi_L}{dt} \approx -\omega_P^2\phi_L \quad (3)$$

where $k_L$ is the torsional spring constant of the torsion pendulum 111 under the tension imposed by the payload 112, $I_S$ is a moment of inertia of the payload 112, $m_L$ is a frictional dissipation term and $\omega_P$ is a pendulation rate of the torsion pendulum. The pendulation rate is related to the pendulation period as $T_P = 2\pi/\omega_P$. Equation 3 represents the contribution of the restoring torque of the torsion pendulum to the angular motion of the payload as a function of twist angle. The actual pointing angle of the payload may include contributions from the balloon as well as the motor.

In equation 3, $m_L$ is assumed to be negligible, thus the pendulation rate, $\omega_P$, is equal to $$\sqrt{\frac{k_L}{I_S}}.$$

In other words, equation 3 represents an oscillation with a pendulation rate (i.e., angular frequency) $\omega_P$. For example, $m_L$ may be negligible for relatively short time intervals relative to a time duration of the pendulation of the torsion pendulum 111. In other words, in the absence of motor rotation, the amplitude of the pendulation may decay over a time interval of on the order of 100 pendulation periods and control operations, as described herein, are configured to be performed during a time interval duration of less than one pendulation period. Thus, $m_L$ is assumed to be negligible.

In some applications, the torsion member 106 may be formed of flexible members, such as ropes. In these applications, the restoring torque may arise from raising and lowering the suspended mass (including payload 112). In these applications, the torsional spring constant, $k_L$, of the torsion pendulum 111 and the moment of inertia, $I_S$, of the payload 112 include contributions from the mass of the payload 112. Thus, the pendulation rate depends on a geometric relationship between the torsion member 106 and a geometric factor in the payload moment of inertia. In other words, changes in mass of, for example, the payload, may not affect the equation of motion for $\theta_S$.

Thus, the payload pointing angle $\theta_S$ may include contributions from the balloon 102, the motor 110 and the twist angle $\phi_L$ of the torsion member 106. The rotation rate, $\omega_S$, of the payload may similarly include contributions from the rotation of the balloon, rotation of the motor and pendulation of the torsion pendulum. Equation 3 illustrates harmonic motion of the torsion pendulum. Combining a solution to equation 3 with equation 2 yields:

$$\theta_S = \theta_B + Ae^{i\sqrt{\frac{k_L}{I_S}}(t-t_0)} + \phi_M \quad (4)$$

where A corresponds to amplitude of pendulation, $t_0$ corresponds to phase of the pendulation and $i=\sqrt{-1}$. In equation 4, $\theta_B$ may be time varying and $\phi_M$ is assumed to be fixed (i.e., the motor is parked). If the balloon is rotating at an approximately constant rate, $\theta_B$ may be increasing linearly. The addition of the contribution from the torsion member 106 corresponds to an oscillation added to $\theta_B$. Maintaining the motor 110 parked (i.e., $\phi_M$ fixed) is configured to simplify equation 4, i.e., facilitates superposition of contributions of $\theta_B$ and $\phi_L$.

Thus, sensed (i.e., measured) payload 112 sensor data ($\theta_S$, $\omega_S$, $\alpha_S$) is related to balloon 102 angle $\theta_B$, balloon rotation rate $\omega_B$, torsion member twist angle $\phi_L$ and torsion member pendulation rate $\omega_P$ and/or pendulation period $T_P$. The relationship between motion of the torsion member and payload motion and position (i.e., angle) may be exploited to determine control inputs to the motor configured to utilize the torsion pendulum to control the angle and motion of the payload, as will be described in more detail below.

Controller circuitry 130 includes a processor circuitry 140, a memory circuitry 142, communication circuitry 144 and a power source 146. Controller circuitry 130 may further include calibration circuitry 150, steering circuitry 152 and motor driver circuitry 156. Controller circuitry 130 may further include data store 160. Processor circuitry 140 is configured to perform the operations of controller circuitry 130. Processor circuitry 140 may include, but is not limited to, for example, a microcontroller, an application specific integrated circuit (ASIC), a Field programmable gate array (FPGA), a system-on-a-chip, etc. Communication circuitry 144 may be configured to communicate, e.g., wirelessly, with other devices (e.g., ground-based devices, other floating devices, aircraft, etc.). Power source 146 may include, for example, an energy storage device (e.g., a battery), a solar cell, etc. Generally, power source 146 may be sized according to power consumption of, for example, the motor 110 and the controller circuitry 130.

Data store 160 is configured to store calibration data, payload pointing data and motor position data. Calibration data may include, but is not limited to, torsion pendulum pendulation rate, pendulation period, balloon position data (e.g., balloon angle, balloon rotation rate) and null motor angle. Payload pointing data includes target and/or measured payload angle, payload rotation rate and payload angular acceleration. Motor position data includes target and/or current (i.e., actual) motor angle and motor speed and may include motor angular acceleration.

Calibration circuitry 150 is configured to perform calibration operations. Calibration operations include determining and/or updating (i.e., correcting) one or more elements of calibration data. Calibration data includes $\omega_P$, $\theta_B$, $\omega_B$ and $\phi_{M,null}$ that corresponds to $\phi_L=0$. The calibration data may be determined and/or updated based, at least in part, on measurements of $\theta_S$, $\omega_S$ and $\alpha_S$. Calibration operations may be performed, initially, when the scientific balloon system 100 reaches float altitude. Additionally and/or alternatively, at least some calibration operations may be performed during steering operations. For example, the balloon angle, balloon rotation rate and/or null motor angle may be updated (i.e., corrected) during steering operations.

Calibration operations include determining pendulation period, $T_P$, based, at least in part, on measurement of payload angular velocity, $\omega_S$. The pendulation period, $T_P$, may be determined with the motor parked, i.e., with $\omega_M$ equal to 0 and $\phi_M$ equal to a constant. For example, the payload angular velocity sensor may be monitored to detect zero crossings in payload angular velocity $\omega_S$. A duration of a time interval between the zero crossings may then be determined. The duration of the time interval may then correspond to the pendulation period $T_P$. The pendulation rate, $\omega_P$, may then be determined as $\omega_P=2\pi T_P$.

In some situations, the torsion pendulum 111 may not be pendulating a sufficient amount to allow detection of zero crossings in the payload angular velocity, $\omega_S$. In these situations, the motor 110 may be driven to rotate a predetermined amount (e.g., $\Delta\phi_{M,min}$) to increase the pendulation. Calibration circuitry 150 may be configured to drive the motor 110 to rotate the predetermined amount. For example, calibration circuitry 150 may provide an input signal to motor driver circuitry 156. The motor driver circuitry 156 may be configured to drive the motor 110, accordingly, in response to the received signal. The rotation of the motor 110 configured to trigger or increase the pendulation may be relatively fast. Motor rotation of the predetermined amount $(\Delta\phi_{M,min})$ is configured to result in pendulation with a peak to peak amplitude of approximately two times the predetermined amount, i.e., $\theta_{S,p-p}=2*\Delta\phi_{M,min}$. The peak to peak amplitude of the payload angle $\theta_{S,p-p}$ may then correspond to the peak to peak amplitude of the pendulation. For example, $\Delta\phi_{M,min}$ may be 45° ($\pi/4$ radians). Rotating the motor shaft 45° may then result in a 90° ($\pi/2$ radians) peak to peak amplitude oscillation (i.e., pendulation) of the torsion pendulum 111. The pendulation period ($T_P$) may then be determined, as described herein.

The balloon angle, $\theta_B$, and the balloon angular velocity, $\omega_B$, may then be determined. The balloon angle, $\theta_B$, and balloon angular velocity, $\omega_B$, may be determined based, at least in part, on the determined pendulation rate, $\omega_P$.

In an embodiment, the balloon parameters, i.e., the balloon angle, $\theta_B$, and the balloon angular velocity, $\omega_B$, may be determined utilizing a linear regression. In one example, the linear regression may be applied to $\theta_S$ over a time interval configured to include a number of torsion pendulation periods, $T_P$. In another example, the linear regression may be applied over a whole number, n (n≥1), pendulation periods, $T_P$. Equation 5, where the angle brackets (i.e., < >) represent a time average, may be utilized for the linear regression. Equation 5 corresponds to equation 4 with equation 1 substituted for $\theta_B$, and rewritten to put the torsion member twist angle oscillatory term on the right side of the equal sign.

$$\langle \theta_S - \omega_B t + \theta_{B,0} + \phi_M \rangle = \langle Ae^{i\omega_P(t-t_0)} \rangle \quad (5)$$

It may be appreciated that over a number of torsion pendulation periods and/or over a sufficient period of time, the term on the right-hand side of equation 5 goes to zero. $\phi_M$ may be known and/or measured and $\theta_S$ and t may be measured, thus, a linear regression may be utilized to determine $\omega_B$ and $\theta_{B,0}$.

In another embodiment, the balloon angular velocity $\omega_B$ may be determined through averaging. For example, equation 4 may be differentiated with respect to time to yield:

$$\omega_S = \omega_B + Ai\sqrt{\frac{k_L}{I_S}} e^{i\omega_P(t-t_0)} \quad (6)$$

A time average of equation 6 may then correspond to:

$$\langle \omega_S \rangle = \langle \omega_B \rangle + 0 \quad (7)$$

Thus, the balloon angular velocity may be determined based, at least in part, on a time average of the payload angular velocity.

Continuing with this embodiment, the balloon phase angle, $\theta_B$, may be determined based, at least in part, on a discrete time derivative of the payload rotation rate, $\omega_S$. Referring again to equation 3, when $d\omega_S/dt$ ($=d^2\theta_S/dt^2$) is equal to zero, the torsion member twist angle, $\phi_L$, is also equal to zero when $\phi_M=0$, i.e., with the motor parked at a reference angle of zero relative to the payload. Thus, the balloon phase angle may be determined from equation 2 where $\theta_S$ is captured at a point in time when $d\omega_S/dt$ is zero radians per second per second. The point in time may be determined to within plus or minus a tolerance of the point in time. $d\omega_S/dt$ may correspond to zero when the value of $d\omega_S/dt$ is within plus or minus a tolerance of zero radians per second per second. For example, the tolerance of the point in time may be 0.01 second. In another example, the tolerance of the point in time may be greater than or less than 0.01 second. Accordingly, the tolerance of the point in time herein can vary within the range of 0.001 second to 0.1 second. For example, the tolerance of $d\omega_S/dt$ may be 0.01 radian per second per second. In another example, the tolerance of $d\omega_S/dt$ may be greater than or less than 0.01 radian per second per second. Accordingly, the predetermined tolerance herein can vary within the range of 0.001 radian per second per second to 0.05 radian per second per second.

In another embodiment, the balloon parameters may be determined (i.e., estimated) in less than one pendulation period based, at least in part, on measurement of the payload rotation rate, $\omega_S$. In this embodiment, a payload rotation rate sensor (e.g., included in payload sensors 132) may be monitored and a plurality of values of the payload rotation rate, $\omega_S$, may be captured. A running discrete derivative of the payload rotation rate with respect to time (i.e., $\Delta\omega_S/\Delta t$) may then be determined. A respective payload angle, $\theta_{S,j}$, j=1, 2, and a corresponding respective time (e.g., a timestamp), $t_j$, when $\Delta\omega_S/\Delta t$ passes through zero (i.e., as $\Delta\omega_S/\Delta t$ goes from positive to negative or negative to positive) may then be determined. $\Delta\omega_S/\Delta t$ may be determined to within ±a tolerance of zero. For example, the tolerance of $\Delta\omega_S/\Delta t$ may be 0.01 radian per second per second. In another example, the tolerance of $\Delta\omega_S/\Delta t$ may be greater than or less than 0.01 radian per second per second. Accordingly, the tolerance of $\Delta\omega_S/\Delta t$ herein can vary within the range of 0.001 radian per second per second to 0.05 radian per second per second. The respective payload angles and corresponding respective timestamps may be captured for sequential zero crossings of $\Delta\omega_S/\Delta t$. $\theta_{S,j}$ may then correspond to the balloon phase angles, $\theta_{B,j}$ at times $t_1$ and $t_2$, respectively. A difference between the timestamps (i.e., $t_2$–$t_1$) may then correspond to one half of the pendulation period, i.e., $t_2$–$t_1$=$\pi/\omega_P$=$T_P/2$.

Continuing with this embodiment, amplitude, A, of the pendulation of the torsion member may be determined based, at least in part, on samples of the payload angle over time. For example, the amplitude, A, of the pendulation may be determined as:

$$A \approx \theta_S((t_2+t_1)/2) - \frac{(\theta_S(t_2)+\theta_S(t_1))}{2} \quad (8)$$

where the first term on the right of the approximately equal sign (i.e., $\theta_S((t_2+t_1)/2)$) corresponds to the value of the payload angle at a timestamp halfway between times $t_2$ and $t_1$ and the second term (i.e., $(\theta_S(t_2)+\theta_S(t_1))/2$) corresponds to an average of $\theta_{S,j}$=1, 2. The first term corresponds to a peak amplitude of the payload angle and may include a contribution from rotation of the balloon. The second term is configured to account for changes in payload angle due to rotation of the balloon.

It may be appreciated that the balloon 102 may be rotating at a nonzero rate that may vary during calibration operations (i.e., $d\omega_B/dt \neq 0$). Thus, the calibration operations are configured to provide estimates of balloon parameters. If the balloon rotation rate is not varying (i.e., $\omega_B$ constant and $d\omega_B/dt=0$), then the calibration operations may provide actual values of the balloon parameters. Contributions to the estimates as a result of variation in balloon rotation rates are assumed to be small. In other words, a period of one full rotation of the balloon 102 is relatively large compared to one period of pendulation of the torsion element 106. Thus, the rotation rate of the balloon may be relatively small compared to the pendulation rate of the torsion element. Thus, during the time intervals associated with the calibration operations, contributions from nonzero variation in balloon rotation rate may be relatively small.

A motor angle, $\phi_M = \phi_{M,null}$ ("null motor angle"), that corresponds to a torsion member twist angle, $\phi_L$, equal to zero, may then be determined. The null motor angle may be determined as:

$$\phi_{M,null} = \theta_S - \theta_B \quad (9)$$

Equation 9 corresponds to equation 2 with the torsion member twist angle, $\phi_L$, set to zero. The null motor angle may initially be determined during calibration operations and may then be updated, i.e., corrected, during steering operations. The null motor angle may be determined and/or updated based on a current measured value of the payload angle and/or a predicted payload angle. The balloon angle may be determined based, at least in part, on balloon rotation rate and balloon initial angle, and a duration of a time interval since determination and/or estimation of the balloon initial angle. For example, the balloon angle may be determined according to equation 1.

Thus, calibration operations are configured to determine the pendulation period, $T_P$, and the corresponding pendulation rate, $\omega_P$. Calibration operations are further configured to determine and/or estimate balloon parameters $\omega_B$ and $\theta_B$ and/or the null motor angle, $\phi_{M,null}$. The balloon parameters and/or the null motor angle may be updated, i.e., corrected, during steering operations, as described herein. The determinations and/or estimations may be performed utilizing measured payload angular motion data, i.e., $\theta_S$, $\omega_S$ and/or $\alpha_S$ captured over time. If, during calibration operations to determine $T_P$ and $\omega_P$, the torsion pendulum 111 is not pendulating with sufficient pendulation amplitude, then pendulation may be initiated and/or enhanced by operation of the motor, as described herein. The calibration data, i.e., values of the pendulation period, the corresponding pendulation rate, the balloon parameters and the null motor angle may be stored by, e.g., calibration circuitry 150, to data store 160.

Steering circuitry 152 may then be configured to steer the payload 112 based, at least in part, on the calibration data. Steering the payload may include accommodating a nonzero balloon rotation rate and/or changing a payload pointing angle from a prior target angle to a new target angle. Steering the payload may further include adjusting the payload pointing angle and/or the motor rotation rate to account for changes in balloon rotation rate and/or to correct for errors in payload pointing angle that may occur over time. For example, the steering circuitry 152 may be configured to drive the motor to adjust a twist angle ($\phi_L$) of the torsion member 106. The adjusting the twist angle may be configured to adjust a payload pointing angle ($\theta_S$) to a new target pointing angle or maintain the payload pointing angle within a predetermined tolerance of a current target payload pointing angle. In one nonlimiting example, the predetermined tolerance may be 0.01 radian. In another example, the predetermined tolerance may be greater than or less than 0.01 radian. Accordingly, the predetermined tolerance herein can vary within the range of 0.001 radian to 0.05 radian.

Steering circuitry 152 is configured to set the motor speed, i.e., motor rotational velocity, to minus the balloon rotation rate (i.e., set $\omega_M = -\omega_B$). In other words, the motor speed may be equal and opposite to the balloon rotation rate. Steering circuitry 152 may then be configured to drive the motor 110 to set the motor angle to the null motor angle (i.e., set $\phi_M = \phi_{M,null}$). For example, steering circuitry 152 may provide a signal to motor driver circuitry 156 configured to set $\phi_M$ to $\phi_{M,null}$. It may be appreciated that the payload angular velocity $\omega_S$ is configured to be zero when the motor rotational velocity $\omega_M$ equals the negative of the balloon rotation rate $-\omega_B$ and the motor angle $\phi_M$ is equal to the null motor angle $\phi_{M,null}$. Maintaining the motor angle $\phi_M$ at the null motor angle $\phi_{M,null}$ is configured to facilitate maintaining the motor speed $\omega_M$ at the negative of the balloon rotation rate $-\omega_B$. Thus, the payload pointing angle $\theta_S$ may be maintained at a target payload pointing angle $\theta_{S,target}$ and balloon rotation may be accommodated.

The payload angular velocity $\omega_S$ may then be controlled by control of the motor angle $\phi_M$ relative to the null motor angle $\phi_{M,null}$. A change in motor angle relative to the null motor angle may correspond to a difference between a target motor angle and the null motor angle, i.e., $\Delta\phi_M = \phi_{M,target} - \phi_{M,null}$. As used herein, "displacement motor angle" corresponds to $\Delta\phi_M$. A nonzero displacement motor angle $\Delta\phi_M$ corresponds to a nonzero twist angle $\phi_L$ of the torsion member. In other words, adjusting the displacement motor angle $\Delta\phi_M$ to a nonzero value results in a corresponding nonzero twist angle $\phi_L$ of the torsion member. The angular velocity $\omega_S$ and/or pointing angle $\theta_S$ of the payload may then be adjusted, i.e., may change, as the torsion pendulum pendulates from an initial twist angle equal to the displacement motor angle (i.e., $\phi_{L,initial} = \Delta\phi_M$) to equilibrium (i.e., $\phi_L = 0$ and $\phi_M = \phi_{M,null}$). An equation of motion for $\theta_S$ as a function of displacement motor angle may be written as:

$$\frac{d^2\theta_S}{dt^2} = \frac{d\omega_S}{dt} \approx -\omega_P^2 \phi_L = \omega_P^2 \Delta\phi_M \quad (10)$$

a displacement motor angle corresponds to a negative torsion member twist angle in equation 10. Thus, an increase in motor angle corresponds to an increase in payload angle as a result of the restoring force of the torsion member 106 and the initial twist angle equal to the displacement motor angle.

Controller circuitry 130 and/or steering circuitry 152 may be configured to receive target pointing data from a payload device, e.g., payload device 134 of FIG. 1. For example, the target pointing data may include a target payload pointing angle, $\theta_{S,target}$. Steering circuitry 152 may be configured to drive the motor to set the payload pointing angle to an initial target payload pointing angle following calibration operations, as described herein. Steering circuitry 152 may then be configured to maintain the payload pointing angle at the initial target payload pointing angle. During steering operations, a new target payload pointing angle may be received. Steering circuitry 152 may then be configured to adjust the payload pointing angle to the new target payload pointing angle. Thus, steering operations may include maintaining the payload pointing angle within a predetermined tolerance of a target payload pointing angle and/or adjusting a payload pointing angle from a current (i.e., actual) target payload pointing angle to a new target payload pointing angle.

The manner in which the motor 110 is driven (i.e., characteristics of the control inputs to the motor) may be related to whether the payload pointing angle is being maintained at a target value or is to be adjusted from a current target value to a new target value. For example, control inputs to adjust from an initial value to a new target value are configured to be relatively fast. In another example, control inputs to maintain the payload pointing angle at a target value are configured to be relatively smooth.

Generally, steering circuitry 152 is configured to monitor sensors 124, 132 to capture payload pointing data and motor position data. Steering circuitry 152 may be configured to capture payload pointing data at a sample rate with a corresponding sample period. The sample period (i.e., time step) may be on the order of ones of seconds. For example, the sample period may be in the range of 1 to 5 seconds. Steering circuitry 152 may then be configured to compare captured (i.e., measured) payload pointing data with corresponding target payload pointing data. If the target values and corresponding measured values differ, steering circuitry 152 may then be configured to drive the motor 110, i.e., command motor driver circuitry 156 to drive the motor 110, to adjust the motor angle from the null motor angle to a target displacement motor angle.

Driving the motor 110 to the target displacement motor angle is configured to twist the torsion member 106 a corresponding twist angle, $\phi_L$. The twist may then effect a change in payload pointing angle and/or a change in payload angular velocity. Thus, the restoring force of the torsion member 106 may be utilized to adjust the payload pointing angle, $\theta_S$.

The target displacement motor angle may be determined based at least in part on a current ("actual") payload angular velocity and a target payload angular velocity as:

$$\Delta\phi_{M,target} = \frac{\omega_{S,target} - \omega_{S,actual}}{\omega_P^2 t_2} = \frac{\Delta\omega_S}{\omega_P^2 t_2} \quad (11)$$

where $t_2 \ll T_P$. $t_2$ may be on the order of ones or tens of seconds. For example, $t_2$ may be in the range of 2 to 5 seconds. In another example, $t_2$ may be in the range of 2 to 10 seconds.

The target payload angular velocity may be determined based, at least in part, on a difference between a current ("actual") payload angle and a target payload angle as:

$$\omega_{S,target} = \frac{\theta_{S,target} - \theta_{S,actual}}{t_1} = \frac{\Delta\theta_S}{t_1} \quad (12)$$

and $t_1$ may be determined as:

$$t_1 = \frac{t_S + t_L\left(\frac{\Delta\theta_S}{\text{knee}}\right)^2}{1 + \left(\frac{\Delta\theta_S}{\text{knee}}\right)^2} \quad (13)$$

where $t_2 < t_1$, $t_S$ is in the range of 10 to 30 seconds, $t_L$ is in the range of 30 to 120 seconds and knee is in the range of 5 to 15 degrees (i.e., $\pi/36$ and $\pi/12$ radians). "knee" is a predetermined value related to a transition from relatively large $\Delta\theta_S$ values to relatively small $\Delta\theta_S$ values. For example, a knee value of 10 degrees (i.e., $\pi/18$ radians) may provide a relatively fast convergence to a target angle when a difference between an actual angle and the target angle is relatively large. Continuing with this example, the knee value of 10 degrees may facilitate noise rejection via time averaging of payload pointing data when the payload angle (i.e., actual angle) is relatively close to the target angle. Thus, equations 12 and 13 are configured to implement proportional control and equation 13 is configured to provide a proportionality value.

It may be appreciated that equation 11 follows from equation 10 with the payload angular acceleration term equal to a discrete derivative of the payload angular velocity and considering $t_2 \ll T_P$. It may be further appreciated that equations 11 through 13 relate a payload pointing error and/or new payload pointing angle to a displacement motor angle, i.e., to the target displacement motor angle, $\Delta\phi_{M,target}$.

Steering circuitry 152 is configured to drive the motor to adjust a twist angle ($\phi_L$) of the torsion member. Adjusting the twist angle is configured to adjust a payload pointing angle ($\theta_S$) to a new target pointing direction or maintain the payload pointing direction ($\theta_S$) within a predetermined tolerance of a current target payload pointing direction (i.e., target payload angle). In one nonlimiting example, the predetermined tolerance may be 0.01 radian. In another example, the predetermined tolerance may be greater than or less than 0.01 radian. Accordingly, the predetermined tolerance herein can vary within the range of 0.001 radian to 0.05 radian. Steering circuitry 152 is configured to control the motor 110 (via motor driver circuitry 156) to drive the torsion member 106 to adjust and/or change payload pointing angle, $\theta_S$. In one example, the payload pointing angle may be adjusted, in a closed-loop fashion, in response to detecting an error, $\varepsilon_{\theta S}$, between a target pointing angle and an actual pointing angle. In another example, the payload pointing angle may be changed to a new pointing angle from a current pointing angle, e.g., in response to a signal from payload devices 134.

For example, steering circuitry 152 may be configured to capture the current payload pointing angle, $\theta_{S,actual}$, and to compare the current payload pointing angle, $\theta_{S,actual}$, to the target payload pointing angle, $\theta_{S,target}$. If the difference between the current payload pointing angle and the target payload pointing angle is greater than the payload pointing angle error, then steering circuitry 152 is configured to determine a target payload angular velocity, $\omega_{S,target}$, according to equations 12 and 13. Steering circuitry 152 may then be configured to capture the current payload angular velocity, $\omega_{S,actual}$, and to determine the target displacement motor angle, $\Delta\phi_{M,target}$, according to equation 11. Steering circuitry 152 may then be configured to signal motor driver circuitry 156 to turn the motor 110 to the target displacement motor angle $\Delta\phi_{M,target}$ and to maintain the motor angle $\Delta\phi_M$ equal to the target displacement motor angle $\Delta\phi_{M,target}$ for a time interval of duration $t_2$. Steering circuitry 152 may then drive the motor to the null motor angle. Steering circuitry 152 may then be configured to delay for a time period equal to $t_1$ minus $t_2$ and to then repeat the operations until the difference between the target payload pointing angle in the actual payload pointing angle is less than the payload pointing angle error.

Thus, motor 110 may be configured to twist a torsion member of a torsion pendulum and the twist (i.e., the restoring force) may then be utilized to control, adjust and/or change a payload pointing angle of a scientific payload.

In some embodiments, the balloon parameters and/or the null motor angle may be updated, e.g., corrected, during steering operations. Updating during steering operations may avoid halting scientific data acquisition operations to recalibrate.

The null motor angle may be updated based, at least in part, on a measured payload angular acceleration and based, at least in part, on a determined payload angular acceleration. For example, the measured payload angular acceleration may be captured from a payload angular acceleration sensor. In another example, the measured payload angular acceleration may be determined based, at least in part, on a difference between two samples of payload angular velocity divided by a duration of a time interval between the capture of the two samples.

The determined payload angular acceleration may be determined based, at least in part, on equation 10, i.e., the pendulation rate (from calibration) and the current displacement motor angle. A difference between the measured and determined payload angular accelerations may then be utilized to correct the null motor angle (since displacement motor angle equals the target motor angle minus the null motor angle, as described herein).

The updated null motor angle may then be utilized to check a current balloon angle and to correct the balloon angle if an error is detected. From equation 9, the null motor angle is equal to the difference between the payload angle and the balloon angle. Thus, capturing the payload angle when the motor angle is at the null motor angle and utilizing equation 9, a current balloon angle may be determined. In other words, the pendulation rate is a characteristic of the physical system that may be determined and is generally constant over time. On the other hand, the balloon angle (and rotation rate) may vary in response to external torques experienced by the balloon system. Thus, the generally constant parameter of the physical system may be utilized to update the modeled balloon angle.

Thus, the null motor angle and balloon angle may be updated, e.g., corrected, during steering operations.

FIGS. 2A through 2D illustrate elements of example payload pointing angles at various times ($t=0-$, $t=0+$, $t=t_{intermediate}$, $t=t_{final}$), consistent with several embodiments of the present disclosure. FIGS. 2A through 2D are configured to illustrate relationships between the balloon angle ($\theta_B$), payload angle ($\theta_S$), motor angle ($\phi_M$) and torsion member twist ($\phi_L$) during operation of system 100 and controller circuitry 130 of FIG. 1. In the examples, at time $t=0-$, the system is in equilibrium; at time $t=0$, the motor is rotated from $\phi_{M,null}=\phi_{M,1}$ to $\phi_{M,2}$; at time $t=0+$, the torsion member has twisted but the payload angle has not yet changed; at time $t=t_{intermediate}$, the payload is rotating and at time $t=t_{final}$, the system has achieved a new equilibrium.

Each of FIGS. 2A through 2D illustrates a top view angle diagram of the angles of the elements of system 100 at a respective instant in time. In other words, FIGS. 2A through 2D illustrate the angular relationships described in equation 2. Each angle diagram of FIGS. 2A through 2D includes angles in a first quadrant and the horizontal axis corresponds to a reference direction, e.g., true North. The present disclosure is not limited in this regard. The balloon angle ($\theta_B$) is shown as generally fixed in FIGS. 2A through 2D for ease of illustration.

Figure 2A:
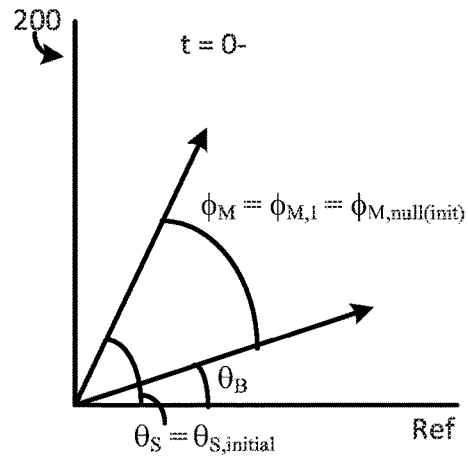
FIGS. 2A through 2D illustrate elements of example angle diagrams at various times, consistent with several embodiments of the present disclosure.

Turning first to FIG. 2A, angle diagram 200 illustrates a steady-state (e.g., equilibrium) condition at time $t=0-$ with $\phi_L=0$ and $\phi_M=\phi_{M,1}$. Thus, $\theta_S=\theta_B+\phi_{M,1}$. $\theta_B$ and $\theta_S$ are measured with respect to the reference angle (Ref) and $\phi_M$ is defined with respect to $\theta_S$, as described herein. $\phi_{M,1}=\phi_{M,null}$ (since the system is steady-state).

Figure 2B:
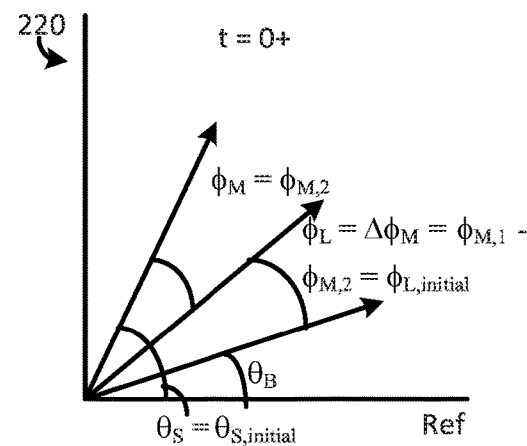

Turning now to FIG. 2B, angle diagram 220 illustrates time $t=0+$. In this example, the motor has rotated from a first motor angle, $\phi_{M,1}$, to a second motor angle, $\phi_{M,2}$, at time $t=0$. Thus, at time $t=0+$, $\theta_B$ and $\theta_S$ are unchanged from angle diagram 200. The torsion member twist $\phi_L$ has changed from 0 to $\Delta\phi_M=\phi_{M,1}-\phi_{M,2}=\phi_{L,initial}$. Angle diagram 220 thus illustrates an effect of the relatively weak spring constant of the torsion member compared to the inertia of the balloon and the payload, as described herein. In other words, immediately following a change in motor angle, the torsion member twists and the payload pointing angle does not instantaneously change.

Figure 2C:
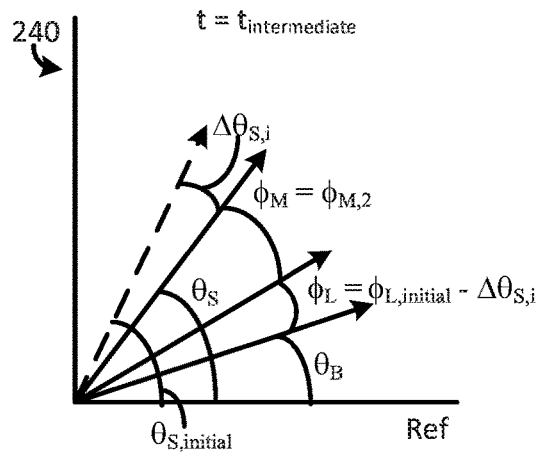

Turning now to FIG. 2C, angle diagram 240 illustrates the angles at an intermediate (i.e., transient) time=$t_{intermediate}$. The payload pointing angle has started to adjust (i.e., change) by $\Delta\theta_{S,i}$ (i.e., $\Delta\theta_{S,intermediate}$). In other words, the payload pointing angle is transitioning from $\theta_{S,initial}$ to $\theta_{S,final}$. The motor angle remains at $\phi_{M,2}$. The torsion element twist angle $\phi_{L,intermediate}$ corresponds to $\phi_{L,initial}-\Delta\theta_{S,i}$.

Figure 2D:
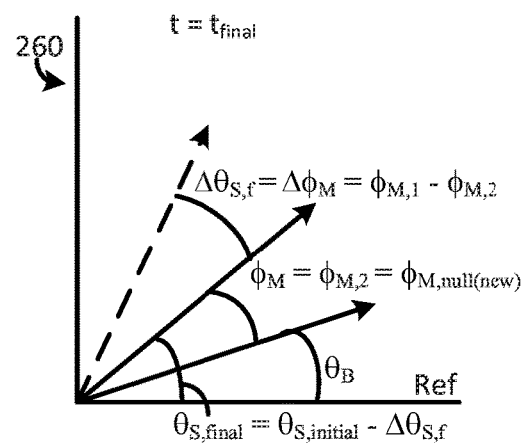

Turning now to FIG. 2D angle diagram 260 illustrates the system at steady-state at time $t=t_{final}$. $\phi_L$ is again 0. $\theta_{S,final}=\theta_{S,initial}-\Delta\theta_{S,f}$, $\Delta\theta_{S,f}=\Delta\phi_M=\phi_{M,1}-\phi_{M,2}$. $\phi_M=\phi_{M,2}=\phi_{M,null}$.

Thus, FIGS. 2A through 2D thus illustrate one simplified example of adjusting a payload pointing angle using a torsion pendulum, as described herein.

Figure 3:
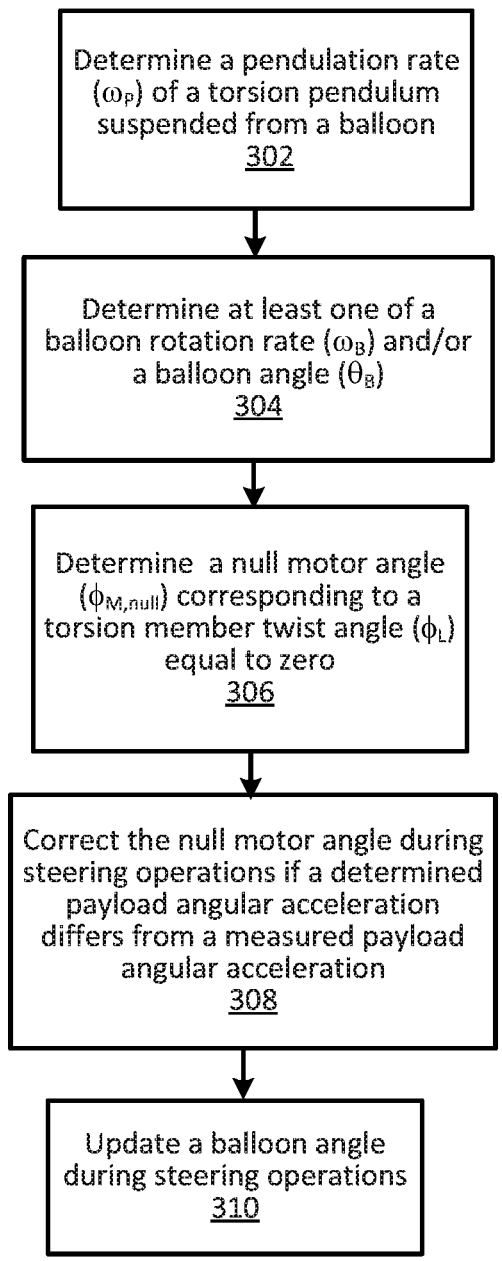
FIG. 3 is a flowchart of calibration operations, according to various embodiments of the present disclosure.

FIG. 3 is a flowchart 300 of calibration operations, according to various embodiments of the present disclosure. In particular, the flowchart 300 illustrates determining calibration data, e.g., the pendulation period, $T_P$, pendulation rate, $\omega_P$, balloon parameters $\omega_B$ and $\theta_B$ and/or the null motor angle, $\phi_{M,null}$. The operations may be performed, for example, by controller circuitry 130 and/or calibration circuitry 150 of FIG. 1.

Operations of this embodiment may begin with determining a pendulation rate, $\omega_P$, of a torsion pendulum at operation 302. The torsion pendulum may be suspended from a balloon and may include a torsion member, a payload and a motor. The payload may be coupled to the torsion member by the motor. At least one of a balloon rotation rate and/or a balloon angle may be determined at operation 304. Operation 306 may include determining a null motor angle during calibration operations at operation 306. The null motor angle corresponds to the torsion member twist angle equal to zero. Operation 308 may include correcting the null motor angle during steering operations, if a determined payload angular acceleration differs from a measured payload angular acceleration. The balloon angle may be updated, i.e., corrected, during steering operations at operation 310.

Thus, calibration data may be determined during calibration operations at least some calibration data may be updated during steering operations.

Figure 4:
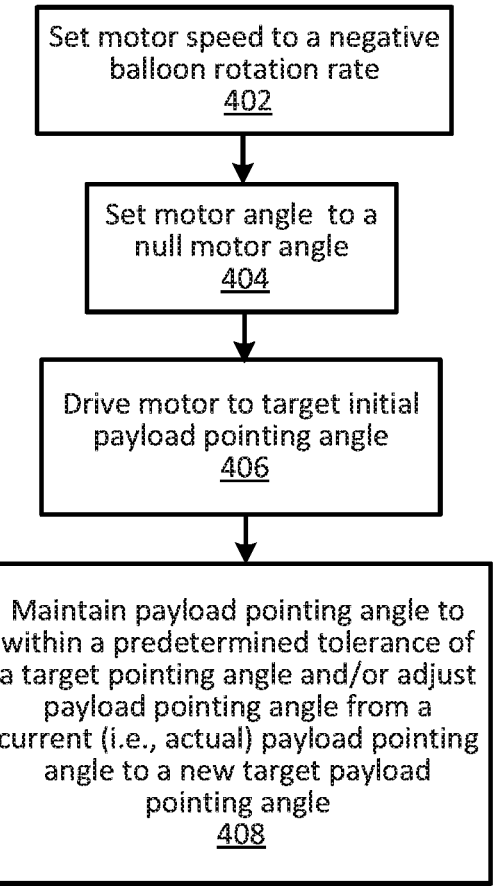
FIG. 4 is a flowchart of steering operations according to various embodiments of the present disclosure.

FIG. 4 is a flowchart 400 of steering operations, according to various embodiments of the present disclosure. In particular, the flowchart 400 illustrates steering a payload based, at least in part, on measured payload parameters and based, at least in part, on calibration data. The operations may be performed, for example, by controller circuitry 130 and/or steering circuitry 152 of FIG. 1.

Operations of this embodiment may begin with setting a motor speed to a negative balloon rotation rate at operation 402. A motor angle may be set to a null motor angle at operation 404. The motor may be driven to a target initial payload pointing angle at operation 406. The payload pointing angle may be maintained within a predetermined tolerance of a target pointing angle and/or the payload pointing angle may be adjusted from a current (i.e., actual) payload pointing angle to a new target payload pointing angle at operation 408.

Thus, a payload may be steered based, at least in part, on measured payload parameters and based, at least in part, on calibration data.

Figure 5:
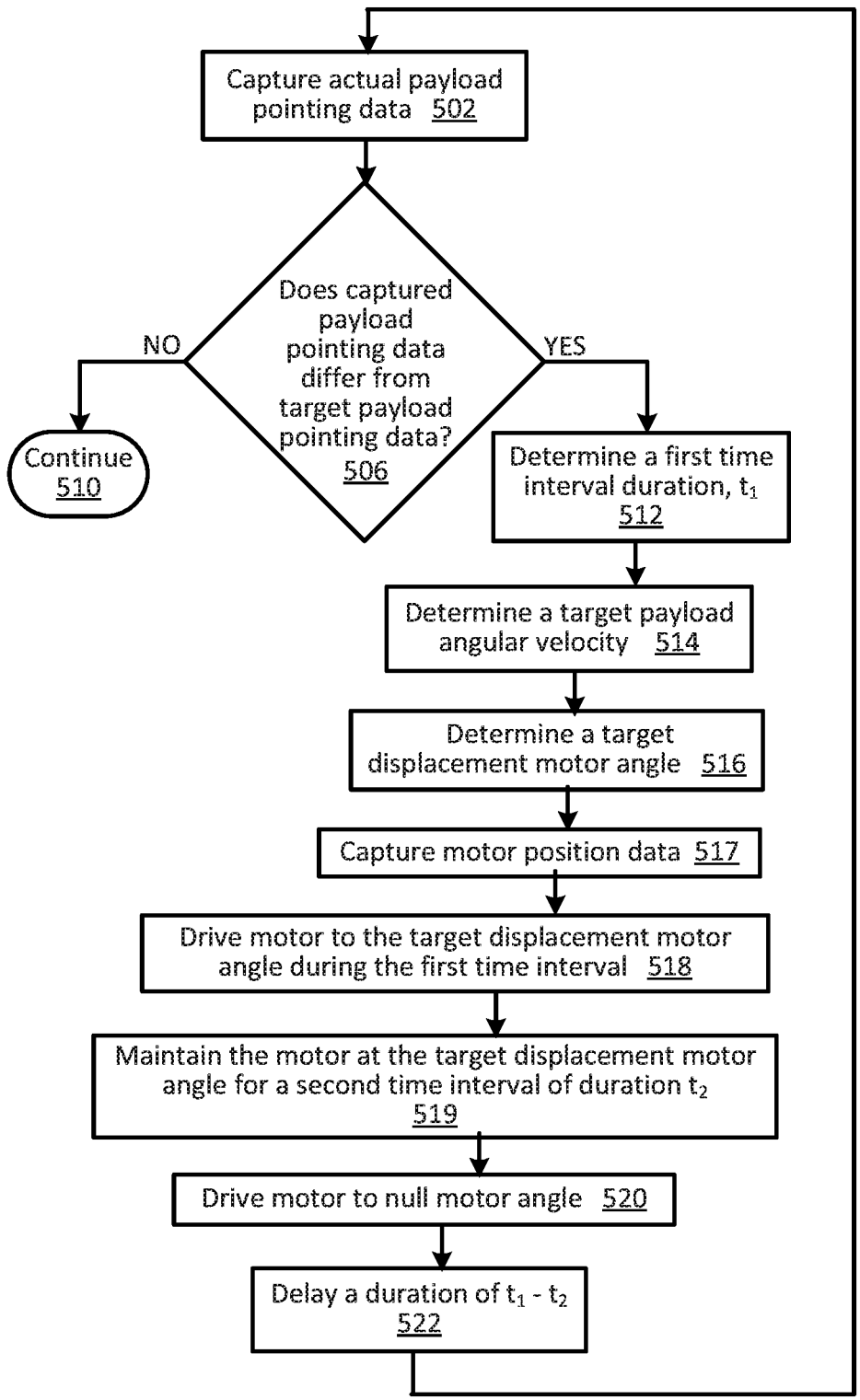
FIG. 5 is a flowchart of payload pointing angle control operations, according to various embodiments of the present disclosure.

FIG. 5 is a flowchart 500 of payload pointing angle control operations, according to various embodiments of the present disclosure. In particular, the flowchart 500 illustrates operations associated with operation 408 of FIG. 4. The operations may be performed, for example, by controller circuitry 130 and/or steering circuitry 152 of FIG. 1.

Operations of this embodiment may begin with capturing current, i.e., actual, payload pointing data at operation 502. Operation 506 may include determining whether the actual payload pointing data differs from target payload pointing data. If the actual payload pointing data does not differ from the target payload pointing data, then program flow may continue with operation 510.

If the actual payload pointing data differs from the target payload pointing data, then a first time interval duration, $t_1$, may be determined at operation 512. Operation 514 may include determining a target payload angular velocity. The target payload angular velocity may be determined based, at least in part, on a difference between a target payload pointing angle and an actual payload pointing angle and based, at least in part, on the first time interval duration, $t_1$. Operation 516 may include determining a target displacement motor angle. The target displacement motor angle may be determined based, at least in part, on the target payload angular velocity, based, at least in part, on the pendulation rate and based, at least in part, on a second time interval duration, $t_2$. Operation 517 may include capturing motor position data. The motor may be driven to the target displacement motor angle during the first time interval at operation 518. The motor may be maintained at the target displacement motor angle for a second time interval of duration $t_2$ at operation 519. The motor may then be driven to the null motor angle at operation 520. Operation 522 may include a delay of duration equal to a difference between the first time interval duration and the second time interval duration (i.e., $t_1-t_2$). Program flow may then proceed to operation 502.

Thus, a payload pointing angle may be maintained within a predetermined tolerance of a target pointing angle and/or the payload pointing angle may be adjusted from a current (i.e., actual) payload pointing angle to a new target payload pointing angle.

While the flowcharts of FIGS. 3, 4 and 5 illustrate operations according to various embodiments, it is to be understood that not all of the operations depicted in FIGS. 3, 4 and 5 are necessary for other embodiments. In addition, it is fully contemplated herein that in other embodiments of the present disclosure, the operations depicted in FIGS. 3, 4 and/or 5 and/or other operations described herein may be combined in a manner not specifically shown in any of the drawings, and such embodiments may include less or more operations than are illustrated in FIGS. 3, 4 and 5. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry 140 executing code and/or instructions sets (e.g., software, firmware, etc.) corresponding to the functionality described herein, thus transforming a general-purpose processor into a specific-purpose processing environment to perform one or more of the operations described herein.

Memory circuitry 142 includes one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory circuitry may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

Thus, an apparatus, method and/or system are configured to drive a motor to twist a torsion member of a torsion pendulum and to utilize a restoring force of the torsion member to adjust a pointing direction (i.e., pointing angle)

of a payload. The apparatus, method and/or system are configured to further control the motor to minimize and/or eliminate pendulation of the torsion pendulum as the payload pointing angle converges on a target payload pointing angle. Calibration data, including a pendulation rate and pendulation period of the torsion pendulum, an angle and rotation rate of a balloon and a null motor angle, may be determined on float. Motor control during steering operations may be based, at least in part, on a relationship between pendulation rate and payload pointing angle. Thus, the mass associated with a reaction wheel and associated mass and cost of a torque motor may be avoided and the dynamics of the torsion pendulum may be exploited.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
calibration circuitry configured to determine a pendulation rate ($\omega_P$) of a torsion pendulum suspended from a balloon, the torsion pendulum comprising a torsion member, a payload and a motor, the payload coupled to the torsion member by the motor;
steering circuitry configured to drive the motor to adjust a twist angle ($\phi_L$) of the torsion member, the adjusting the twist angle configured to adjust a payload pointing angle ($\theta_S$) to a new target pointing angle or maintain the payload pointing angle to within a predetermined tolerance of a current target payload pointing angle;
wherein the steering circuitry is configured to determine a target motor displacement angle ($\Delta\phi_{M,target}$) based, at least in part, on a target payload angular velocity ($\omega_{S,target}$), based, at least in part, on the pendulation rate ($\omega_P$) and based, at least in part, on the target payload pointing angle, and wherein the target payload angular velocity ($\omega_{S,target}$) is determined at a start of a first time interval having duration $t_1$ and the motor is maintained at the target motor displacement angle for a second time interval during the first time interval, the second time interval having duration $t_2$, $t_2$ less than a pendulation period of the torsion pendulum.

2. The apparatus of claim 1, wherein the calibration circuitry is configured to determine at least one of a balloon rotation rate ($\omega_B$) and/or a balloon angle ($\theta_B$).

3. The apparatus of claim 1, wherein the calibration circuitry is configured to determine a null motor angle ($\phi_{M,null}$) during calibration operations and to correct the null motor angle during steering operations if a determined payload angular acceleration differs from a measured payload angular acceleration, the null motor angle corresponding to the torsion member twist angle ($\phi_L$) equal to zero.

4. The apparatus of claim 1, wherein adjusting the torsion member twist angle ($\phi_L$) comprises driving the motor to a target motor displacement angle ($\Delta\phi_{M,target}$), the target motor displacement angle corresponding to a difference between a target motor angle and a null motor angle.

5. The apparatus of claim 1, wherein the calibration circuitry is configured to update a modeled balloon angle during steering operations.

6. A method comprising:
determining, by calibration circuitry, a pendulation rate ($\omega_P$) of a torsion pendulum suspended from a balloon, the torsion pendulum comprising a torsion member, a payload and a motor, the payload coupled to the torsion member by the motor;
driving, by steering circuitry, the motor to adjust a twist angle ($\phi_L$) of the torsion member, the adjusting the twist angle configured to adjust a payload pointing angle ($\theta_S$) to a new target pointing angle or maintain the payload pointing angle to within a predetermined tolerance of a current target payload pointing angle; and
determining, by the steering circuitry, a target motor displacement angle ($\Delta\phi_{M,target}$) based, at least in part, on a target payload angular velocity ($\omega_{S,target}$), based, at least in part, on the pendulation rate and based, at least in part, on the target payload pointing angle, and wherein the target payload angular velocity ($\omega_{S,target}$) is determined at a start of a first time interval having duration $t_1$ and the motor is maintained at the target motor displacement angle for a second time interval during the first time interval, the second time interval having duration $t_2$, $t_2$ less than a pendulation period of the torsion pendulum.

7. The method of claim 6, further comprising determining, by the calibration circuitry, at least one of a balloon rotation rate ($\omega_B$) and/or a balloon angle ($\theta_B$).

8. The method of claim 6, further comprising determining, by the calibration circuitry, a null motor angle (($\phi_{M,null}$) during calibration operations and correcting, by the calibration circuitry, the null motor angle during steering operations if a determined payload angular acceleration differs from a measured payload angular acceleration, the null motor angle corresponding to the torsion member twist angle ($\phi_L$) equal to zero.

9. The method of claim 6, wherein adjusting the torsion member twist angle ($\phi_L$) comprises driving the motor to a target motor displacement angle ($\Delta\phi_{M,target}$), the target motor displacement angle corresponding to a difference between a target motor angle and a null motor angle.

10. A system comprising:
a torsion pendulum suspended from a balloon, the torsion pendulum comprising:
a torsion member;
a payload;
a motor comprising a motor shaft and a motor housing, the motor shaft torsionally rigidly coupled to the torsion member, the motor housing torsionally rigidly coupled to the payload; and
a controller circuitry comprising:
a calibration circuitry configured to determine a pendulation rate ($\omega_P$) of the torsion pendulum;
a steering circuitry configured to drive the motor to adjust a twist angle ($\phi_L$) of the torsion member, the adjusting the twist angle configured to adjust a payload pointing angle ($\theta_S$) to a new target pointing angle or maintain the payload pointing angle to within a predetermined tolerance of a current target payload pointing angle; and
wherein the steering circuitry is configured to determine a target motor displacement angle ($\Delta\phi_{M,target}$) based, based, at least in part, on a target payload angular velocity ($\omega_{S,target}$), based, at least in part, on the pendulation rate and based, at least in part, on the target payload pointing angle, and wherein the target payload angular velocity ($\omega_{S,target}$) is determined at a start of a first time interval having duration $t_1$ and the motor is maintained at the target motor displacement angle for a second time interval during the first time interval, the second time interval having duration $t_2$, $t_2$ less than a pendulation period of the torsion pendulum.

11. The system of claim 10, wherein the calibration circuitry is configured to determine at least one of a balloon rotation rate ($\omega_B$) and/or a balloon angle ($\theta_B$).

12. The system of claim 10, wherein the calibration circuitry is configured to determine a null motor angle ($\phi_{M,null}$) during calibration operations and to correct the null motor angle during steering operations if a determined payload angular acceleration differs from a measured payload angular acceleration, the null motor angle corresponding to the torsion member twist angle ($\phi_L$) equal to zero.

13. The system of claim 10, wherein adjusting the torsion member twist angle ($\phi_L$) comprises driving the motor to a target motor displacement angle ($\Delta\phi_{M,target}$), the target motor displacement angle corresponding to a difference between a target motor angle and a null motor angle.

14. The system of claim 10, wherein the torsion member is a torsion ladder and the motor is a brushless direct current (DC) motor.

* * * * *